United States Patent

[11] 3,581,978

[72] Inventors: Hermann Kappelhoff
Hamburg;
Max Gennerich; Walter Paul; Walter Steinbeck, Lengerich; Willy Niemeyer, Natrup-Hagen, all of, Germany
[21] Appl. No. 842,415
[22] Filed Mar. 19, 1969
Division of Ser. No. 604,495, Oct. 10, 1966, Pat. No. 3,448,666. Division of Ser. No. 356,882, Apr. 2, 1964, Pat. No. 3,313,217.
[45] Patented June 1, 1971
[73] Assignee Windmoller & Holscher
Lengerich, Germany
[32] Priority Apr. 11, 1963
[33] Germany
[31] W34,2951Vc/22i

[54] CROSSED-BOTTOM SACK
4 Claims, 8 Drawing Figs.

[52] U.S. Cl. ........................ 229/62.5,
229/57, 229/55
[51] Int. Cl. ........................ B65d 31/14,
B65d 33/02
[50] Field of Search ........................ 229/58,
62.5, 55, 57, 60; 93/35

[56] References Cited
UNITED STATES PATENTS
1,989,304  1/1935  Andreas ........................ 229/60
2,864,549  12/1958  Hayward et al. ................ 229/57
2,955,517  10/1960  Honsel ........................ 93/35

Primary Examiner—David M. Bockenek
Attorney—Fleit, Gipple & Jacobson

ABSTRACT: A sack of thermoplastic material having a bottom comprising, in its opened, partially formed condition, a pair of opposing corner flaps coated with adhesive on the upper sides thereof and a pair of opposing side flaps coated with adhesive on the under sides thereof, said side flaps having been folded toward each other and laid flat with their adhesive coatings exposed upwardly, and a bottom covering sheet coated with adhesive on one side thereof attached to said side flaps with their respective adhesive coatings in contact.

PATENTED JUN 1 1971 3,581,978
SHEET 1 OF 2
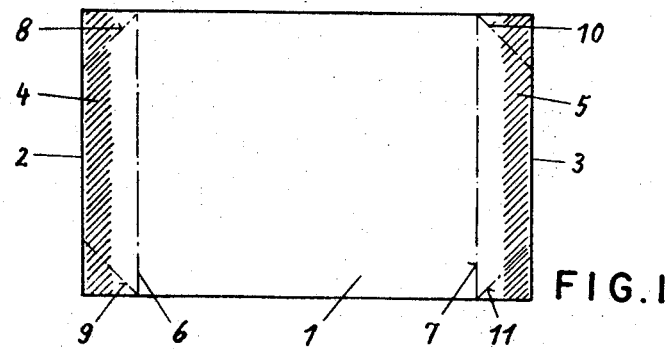
FIG.1
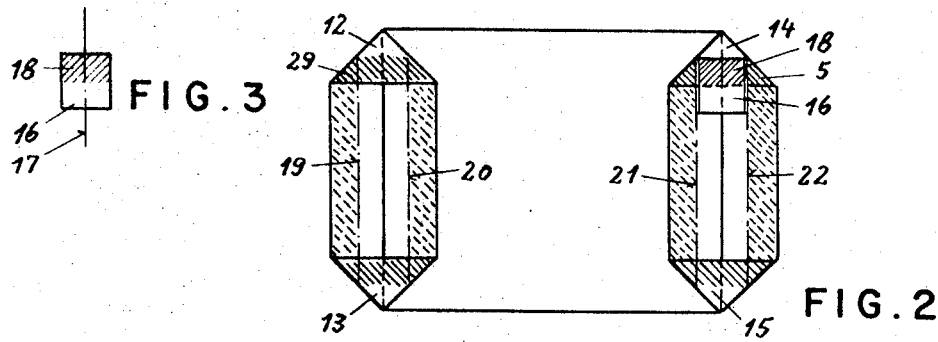
FIG.3
FIG.2
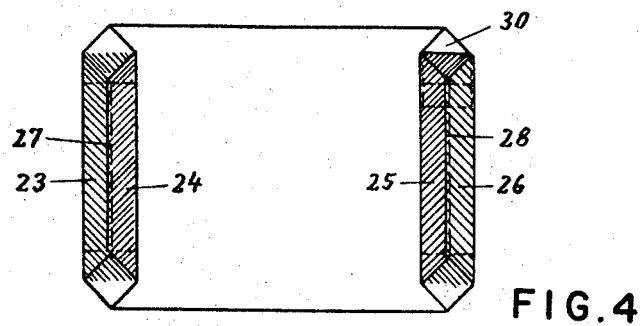
FIG.4
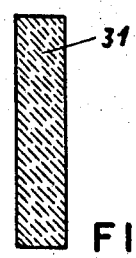
FIG.5
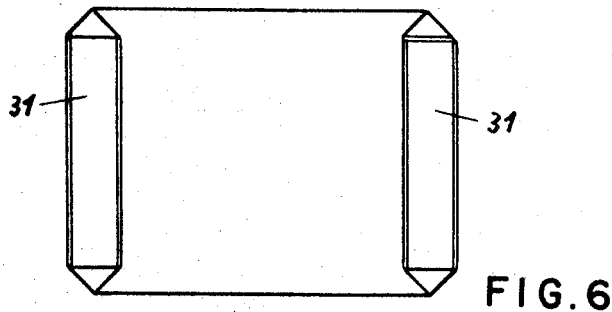
FIG.6

CROSSED-BOTTOM SACK

This is a division of application Ser. No. 604,495, filed Oct. 10, 1966, now U.S. Pat. No. 3,448,666 which, in turn, was a division of application Ser. No. 356,882, filed Apr. 2, 1964, now U.S. Pat. No. 3,313,217.

In the previously known processes of making adhered crossed-bottom sacks, the open bottom is first laid by a bottom-laying machine then the adhesive is applied in the proper size to the open bottom and, if desired, to a valve, an inner patch and/or a bottom covering sheet, and finally the bottom elements are adhered together. This practice requires adhesive applicators which are sometimes rather complicated, and involves the disadvantage that the adhesive must be applied in the bottom-laying machine. Whereas the conventional adhesives can be relatively easily removed when they have dried, more recent adhesives have the inconvenient property of drying very firmly onto the machine elements so that the machine may become blocked very soon. Besides, more recent adhesives for plastic sheeting contain solvents which are so volatile that they cannot be applied by the usual adhesive applicators comprising an immersed roll, a transfer roll and an applicator roll, because the solvent is evaporated too rapidly.

A process of manufacturing crossed-bottom sacks, particularly from plastics materials, is characterized according to the invention in that the tube lengths are provided on the outside, along the edges of their open ends, before the bottom is folded, with an adhesive which is effective in a dry or almost dry condition, this adhesive is applied in a width which corresponds to the width of the bottom side flaps to be subsequently formed, the solvent is substantially evaporated, the bottom is then pulled open and folded, and the surfaces to be adhered to each other are forced together. Hence, the adhesive is applied in the process of the invention before the bottom is folded so that very simple adhesive applicators may be used because it is only necessary to apply adhesive to a strip which extends along the edges and has a width corresponding to the width of the bottom side flaps to be subsequently formed. As the bottom side flaps are adhered when the applied adhesive is dry or almost dry, the adhesive applicators need not be arranged within the bottom-laying machine. All means using liquid adhesive may be arranged before the devices serving to pull open and lay the bottom so that the bottom-laying machine cannot be smeared with adhesive.

In a development of the invention, an adhesive may be used which adheres only to itself, and the bottom side flaps of the crossed bottom may have an adhesive-coated bottom covering sheet adhered to them. As only the outside surfaces of the bottom side flaps are coated with adhesive, the bottom covering sheet, which must be coated with adhesive on the inside, is required and sufficient for adhering the bottom.

In a process of manufacturing sacks from polyolefins, the invention teaches to subject the tube lengths to a surface-activating pretreatment, particularly by electrostatic discharges, before the adhesive is applied, and to use an adhesive which forms cross links with the activated polyolefin surfaces. The manufacture of sacks from polyolefins is known to involve special difficulties because the welding of polyolefin sheating results in a weakening of the material at the seam weld so that the inherent static and dynamic strengths of the sheeting are not achieved, and because it is extremely difficult to use machines for the formation of the various seam welds. Attempts to join the sheeting with the aid of so-called contact adhesives have also failed. The polyolefins being insoluble, a positive bond cannot be formed by adhering and the adhesive bond has not found to be sufficiently durable when such sacks were stored in stacks. Besides, the most conventional contact adhesives contain water and solvent, which evaporate to cause the adhesive or adhesive combination proper to adhere. This evaporation is limited by the sheeting owing to its thickness and the resulting low permeability to vapor, particularly at those points of the sacks where several plies of the sheeting have been superimposed by folding the sack bottom.

In contrast to this, the above-mentioned development of the process according to the invention relies on the fact that the chain molecules at the surface are highly activated by a suitable pretreatment of the polyolefin surfaces. This treatment may be effected by an ozone-forming electrostatic discharge or, e.g., by the action of a lean gas flame, or of chromic acid, permanganate or the like. The resulting oxygen-containing groups, which are highly unstable and not permanent, must be reacted, possibly during the same operation, with suitable, highly active chemical substances to effect cross linking between the activated polyolefins and these agents.

In a further development of the invention, the adhesive may consist of a solvent-dissolved mixture of isocyanate-modified polyesters having free hydroxyl groups, and isocyanate resins. It is suitable to use the isocyanate resins in excess of the stoichimetric amount relative to the polyesters in order to promote the bonding of the isocyanates to the polyolefin molecules. In spite of the fact that the surface of the coating is almost nontacky, the coatings tend to from such a strong adhesive bond when forced together that the sheeting layers can be separated only with destruction of the coating. It must be assumed that the highly polar and reactive isocyanate groups react with the free hydroxyl groups of the polyesters in the adhesive layers and form principal valency bonds with the polyolefin structure with the aid of the oxidized layer formed by the above-mentioned activating process so that a substantially positive bond can be expected.

Although the adhesive may alternatively consist of an epoxy resin which is dissolved in a solvent, the mixture which has been described hereinbefore of isocyanate resins and isocyanate-modified polyesters having free hydroxyl groups has much better adhesive properties.

In order to match the properties, such as the elasticity and ductility, of the cured adhesive layer with those of the sheeting, and to improve the shock resistance, resistance to delamination, and shear strength, suitable modifiers may be added to the adhesive. Substances which are suitable for this purpose include, e.g., polyisobutylene, polyvinlyether, polyvinylcarbazole, chlorinated rubber, interpolymers, chlorinated or sulfo-chlorinated polyolefins and the like. It may also be suitable to add accelerators to the solution.

A sack which has been made by the process described hereinbefore, particularly from a polyolefin, may be characterized according to the invention in that the outside surfaces of the bottom side flaps of each sack bottom are adhered to an adhesive-coated bottom covering sheet. As the adhesives primarily contemplated for use in the process according to the invention adhere only to themselves rather than to uncoated layers of plastics material, it would be suitable to arrange the bottom side flaps exactly in abutting relation. Such an exact work is not possible, however, and a gap would leave a weak point in the bottom. For this reason, a development of the invention resides in that the bottom side flaps overlap each other only in a narrow area. Alternatively, the bottom side flaps may overlap each other in a wide area and the outer bottom side flap may have apertures of substantial area, through which the adhesive bond between the outside surface of the inner bottom side flap and the bottom covering sheet is formed. A valve tube coated with adhesive on both sides may be adhered between one of the infolded corner portions and the bottom covering sheet.

The invention will be explained more fully in the subsequent description with reference to embodiments of the sack according to the invention and of the apparatus for manufacturing the same. These embodiments are shown by way of example in the accompanying drawing, in which:

FIG. 1 shows a flat-lying tube length, which consists of plastics material and is provided with dried adhesive.

FIG. 2 shows the tube length of plastics material as shown in FIG. 1 with the tube ends folded to form open crossed bottoms and with an adhered tubular valve patch.

FIG. 3 shows the tubular valve patch of FIG. 2 provided with dried adhesive.

FIG. 4 shows the tube length of plastics material of FIGS. 1 and 2 with bottom side flaps folded together.

FIG. 5 shows a bottom covering sheet provided on one side with a dried adhesive coating.

FIG. 6 shows the sack blank of FIG. 4 with bottom covering sheets of FIG. 5, which have been adhered onto the crossed bottoms.

Figure 7:
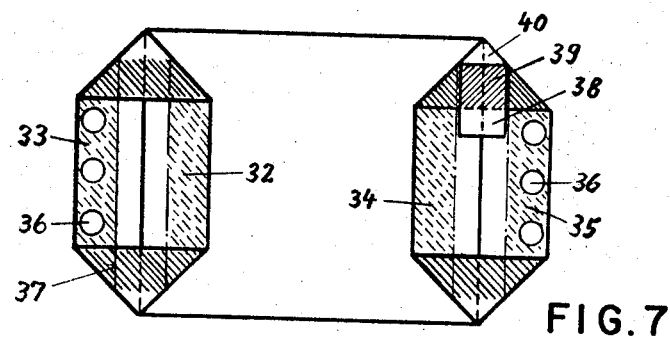
FIG. 7 is a view similar to FIG. 2 and shows a tube length of plastics material according to another embodiment of the invention.

The tube length 1 of thermoplastic material, preferably of polyolefins, is pretreated at its two open ends 2 and 3 on both sides in known manner for surface activation in an area which, for the sake of precaution, extends somewhat beyond the hatched zones 4 and 5, and is provided on both sides in the hatched areas 4 and 5 with coatings of an adhesive which is effective in a dry or almost dry condition and from which the solvent has been evaporated. Hence, the adhesive coatings are dry and will adhere only to a similar adhesive coating. Then the tube end portions are folded open in a known manner along the intended fold lines 6 to 11 indicated in dash-dot lines in FIG. 1 to form open crossed bottoms as shown in FIG. 2 with infolded corner portions 12 to 15.

In the meantime, a tube length 16, also of thermoplastic material, particularly of polyolefins, has been formed preferably by severing from a starting tube which is moved in the longitudinal direction 17 of the tube and in areas spaced by the length of the tube lengths to be formed has been properly pretreated and provided with an adhesive coating 18, which has the same composition and the same width as the adhesive coatings 4 and 5.

To form a filling valve, the tube length 16 is then adhered by that portion of the adhesive coating 18 which is on the underside of the tube onto the adhesive coating 5 on the infolded corner portion 14 in the middle of the bottom in such a manner that that portion of the tube length which is not provided with adhesive protrudes inwardly.

The adhesive coatings 4 and 5 extend to the intended bottom fold lines 19 to 22, along which the bottom side flaps 23 to 26 are folded over toward the middle of the bottom, as is shown in FIG. 4. The sequence of the folding-over operations is not significant. It would be desirable to cause the bottom side flaps to abut exactly. As such an exact work is not practicable and a gap would form a weak point in the bottom, the dimensions are selected so that the bottom side flaps 23 to 26 just overlap in the intermediate areas 27 and 28, respectively. The triangular areas such as 29, FIG. 2, of the infolded corner portions are folded over together with the bottom side flaps and are adhered to the underlying, adhesive-coated surface of the infolded corner portions or, in the valved corner 30, to the adhesive coating 18 on the valve patch 16.

The bottom is completed by a bottom covering sheet 31, which is shown in FIG. 5 and has been pretreated and provided with the adhesive layer according to the invention at least on one side. One of these sheets is applied to each crossed bottom and adhered to it by the contact between the dry adhesive coatings on the bottom and on the covering sheet.

Figure 8:
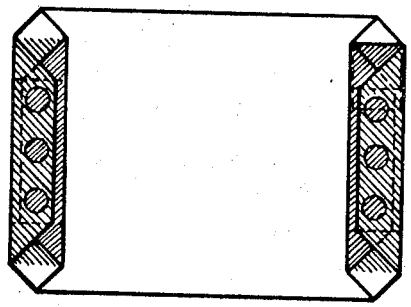
FIG. 8 shows the tube length of plastics material of FIG. 7 with bottom side flaps folded one over the other.

In the second embodiment shown in FIGS. 7 and 8, the dimensions are such that the bottom side flaps 32 to 35 overlap to a large extent, as is apparent from FIG. 8. The last bottom side flaps 33 and 35 which have been folded over are formed with relatively large holes, such as 36, through which the adhesive layer of the bottom side flaps 32 and 34 folded over first adheres to the bottom covering sheet, such as 31 (FIG. 5), which is also applied in this embodiment.

The adhesive coatings extend in this case also to the bottom fold lines 37. A valve patch 38 having an adhesive coating 39 of appropriate width is adhered in a similar manner into the valved corner 40.

It may be pointed out that in both embodiments the bottom side flaps do not adhere to each other in their overlap area because only one of the two contacting surfaces, namely, that of the bottom side flap to be folded over first, carries an adhesive coating, and this coating will not adhere to the other surface, which is not provided with adhesive.

What we claim is:

1. A sack of thermoplastic material having a bottom comprising, in its opened, partially formed condition, a pair of opposing corner flaps coated with adhesive on the upper sides thereof and a pair of opposing side flaps coated with adhesive on the under sides thereof, said side flaps having been folded toward each other and laid flat with their adhesive coatings exposed upwardly, and a bottom covering sheet coated with adhesive on one side thereof attached to said side flaps with their respective adhesive coatings in contact.

2. A sack as defined in claim 1, characterized in that the bottom side flaps overlap each other only in a narrow area.

3. A sack as defined in claim 1, characterized in that the bottom side flaps overlap each other in a wide area, and the outer bottom side flap has apertures of substantial area.

4. A sack as defined in claim 1, further comprising a valve tube coated with adhesive on both sides adhered to one of the corner flaps and the bottom covering sheet.